United States Patent [19]

Vojir et al.

[11] Patent Number: 4,599,701
[45] Date of Patent: Jul. 8, 1986

[54] COMPLEX MAGNITUDE COMPUTATION

[75] Inventors: William M. Vojir, Seaford; Cecelia Jankowski, East Norwich, both of N.Y.

[73] Assignee: Grumman Aerospace Corporation, Bethpage, N.Y.

[21] Appl. No.: 543,333

[22] Filed: Oct. 19, 1983

[51] Int. Cl.$^4$ .............................................. G06F 7/552
[52] U.S. Cl. ..................................... 364/752; 364/814
[58] Field of Search ............... 364/752, 729, 730, 731, 364/603, 814, 815

[56] References Cited

U.S. PATENT DOCUMENTS

| 3,829,671 | 8/1974 | Gathright | 364/752 |
| 3,858,036 | 12/1974 | Lunsford | 364/752 |
| 3,870,871 | 3/1975 | Nead | 364/814 |
| 4,481,601 | 11/1984 | Heinle | 364/815 |

FOREIGN PATENT DOCUMENTS

| 268023 | 7/1970 | U.S.S.R. |
| 634271 | 11/1978 | U.S.S.R. |
| 642704 | 1/1979 | U.S.S.R. |

OTHER PUBLICATIONS

Adams et al, "Magnitude Approximations for Microprocessor Implementations", IEEE Micro, Oct. 1983, pp. 27-31.

Primary Examiner—David H. Malzahn
Attorney, Agent, or Firm—Morgan, Finnegan, Pine, Foley & Lee

[57] ABSTRACT

A digital circuit is disclosed for computing the magnitude of a complex number employing piece-wise linear approximations to achieve precision without the need for iteration. An illustrative implementing circuit employs a first stage for converting the in-phase and quadrature signals to their absolute values. The resultant signals are applied to a selection circuit which selects the maximum and minimum values. The resultant signals are combined with coefficients selected as a function of the operating interval and the resultant products added to yield a signal related to the magnitude of the input complex number.

9 Claims, 4 Drawing Figures

ARITHMETIC SECTION

LOGIC ARRAYS

ADDERS

COMPLEX MAGNITUDE COMPUTATION

This invention relates to digital signal processing and more particularly to digital processing which involves computing the magnitude of a complex number

BACKGROUND

Circuits for computing magnitudes of complex numbers are widely used. Navigation and fire control systems, for example, make extensive use of such circuits. Both analog and digital approaches are used, and in the case of digital implementation, a special purpose circuit may be used or a general purpose computer may be employed.

As new signal processing applications have developed, they have brought with them the need for more rapid and accurate computations, trends which are often at cross purposes. These requirements are manifested for example in real time digital signal processing in such areas as radar, acoustics and image processing. Although iteration is often employed in such applications to achieve precision, the resultant process is time-consuming and limits the computation rate.

It is accordingly an object of the invention to provide a complex magnitude computing process and circuit which simultaneously provides high precision and high throughput. Another object of the invention is to provide a digital circuit for computing complex number magnitudes which is amenable to VLSI or gate array implementation. A still further object is to provide a complex magnitude computing technique amenable to expanded word length and increased resolution.

SUMMARY

These objects are achieved by a complex magnitude computing circuit which implements piece-wise linear approximations to achieve high precision without the need for iteration and its processing burden. Coefficients and parameters for such approximations are derived to take the form of binary fractions to facilitate implementation.

THE DRAWING

Serving to illustrate exemplary embodiments of the invention are the drawings of which:

DESCRIPTION

The complex magnitude of
$Z = A + iB$,
$r(A,B) = \sqrt{A^2 + B^2}$
can be represented by a dual piecewise linear approximation and an error term:

$$r = a\max(|A|, |B|) + b\min(|A|, |B|) + D. \tag{1}$$

Because $r(A,B) = r(B,A)$ one can assume that $A \geq B$.

Letting $B/A = X$, where $(0 \leq X \leq 1)$ yields: $\quad(2)$ $$r = \sqrt{A^2 + B^2} = |A|\sqrt{1 + X^2}. \tag{3}$$

The error term $D = |A|\sqrt{1 + X^2} - a|A| - b|B|$, or $\quad(4)$ $$D = |A|(\sqrt{1 + X^2} - a - bX) \tag{}$$

The relative error, $R(X) = D/r = 1 - (a + bX)/\sqrt{1 + X^2}$ $\quad(5)$

The coefficients a and b may be related by the variable $X = b/a$ where $0 \leq X \leq 1$. X may then be assigned the value of R(X) to minimize the relative error within the range of $0 \leq X \leq 1$. This is achieved by equating the relative errors:

$$R(0) = R(1) = R(b/a), \tag{6}$$

and solving 2 non-linear simultaneous equations.

The accuracy of this method for various values of a and b ranges from 3.96% to 11.3% relative error.

To achieve a more accurate approximation, the interval (0,1) may be divided into subintervals. In the case of two subintervals, the coefficients $a_1$, $b_1$, and $a_2$, $b_2$ of the relative error function in each subinterval and the subinterval dividing point, (w) can be derived to minimize the maximum error over the entire range. Thus:

$$R_1(Z) = 1 - (a_1 + b_1 Z)/\sqrt{1 + Z^2} \tag{7}$$

$$R_2(Z) = 1 - (a_2 + b_2 Z)/\sqrt{1 + Z^2} \tag{8}$$

Figure 2:
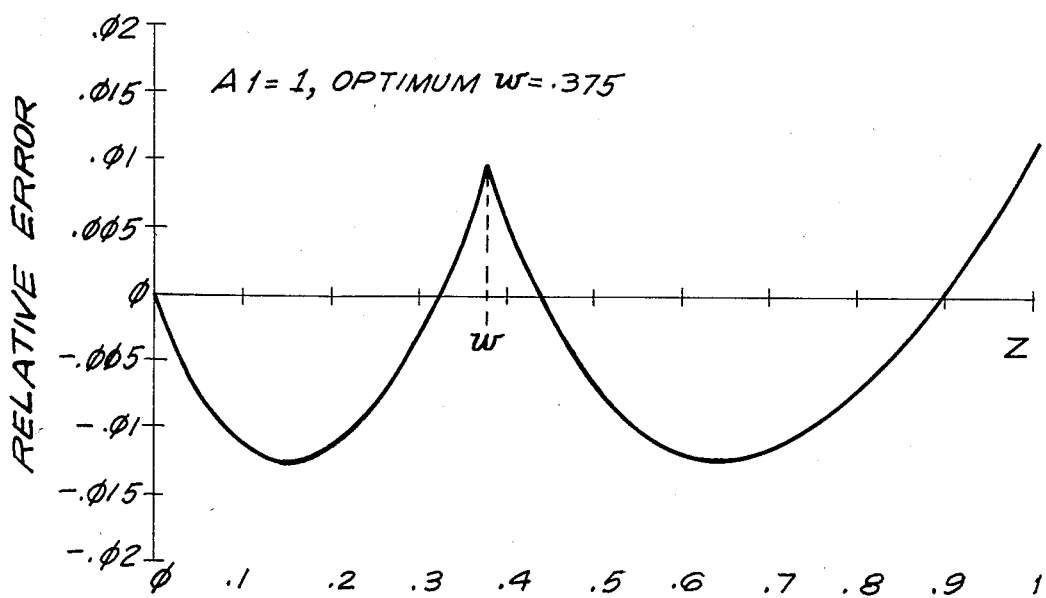
FIG. 2 is a graphic plot of relative error.

FIG. 2 is a plot of the composite relative error function which may be defined as $$R(Z) = \begin{cases} R_1(Z) & 0 \leq Z \leq w \\ R_2(Z) & w \leq Z \leq 1 \end{cases} \tag{9}$$

The general parameters $a_1$, $b_1$, $a_2$, $b_2$ and w are calculated from the following system of five non-linear equations:

$$R_1(0) = R_1(w) \tag{10}$$

$$R_1(0) = -R_1(b_1/a_1) \tag{11}$$

$$R_2(1) = R_2(w) \tag{12}$$

$$R_2(1) = -R_2(b_1/a_1) \tag{13}$$

$$R_1(w) = R_2(w) \tag{14}$$

Table 1 gives the results of a solution of these equations. Note that the dividing point, w, is quite likely equal to $\sqrt{2} - 1$. From a hardware standpoint, implementing this value of w has disadvantages in that it requires an extra, time-consuming multiplication. However, as will be shown below, another approximation leads to an avoidance of this shortcoming.

TABLE 1 w = 0.414214

$a_1 = 0.990299$
$b_1 = 0.196983$
$a_2 = 0.839535$
$b_2 = 0.560960$

The first coefficient, $a_1 = 0.990$, is sufficiently close to 1, so that setting it equal to unity would simplify the hardware without significantly affecting the accuracy. Rerunning the parametric analysis with this restriction gives the remaining four parameters (see Table 2). Note that in this case the value of the subinterval dividing point w (0.378227) is very close to the value $\frac{3}{8}$ which, being a binary fraction, is much easier to implement in hardware. As will be seen, the approach permits all parameters to be implemented as binary fractions thereby yielding significant hardware advantages.

TABLE 2

$w = 0.378227$
$a_1 = 1.0$
$b_1 = 0.150824$
$a_2 = 0.849509$
$b_2 = 0.548710$

A fixed point data representation analysis gives the remaining parameters as binary fractions which are listed in Table 3. The final error analysis plot is illustrated in FIG. 2 while the maxima and minima and value of w are listed in Table 3. As can be seen, implementation guarantees a worst-case relative error of 1.21% which is significantly (more than 3 times) better than the initially described single interval case.

TABLE 3

$w = 0.375$
$a_1 = 1$
$b_1 = 20/128$
$a_2 = 109/128$
$b_2 = 70/128$
min 1 = −0.01213266752
max 1 = 0.00880778468
min 2 = −0.01204172986
max 2 = 0.01115536068

Figure 1:
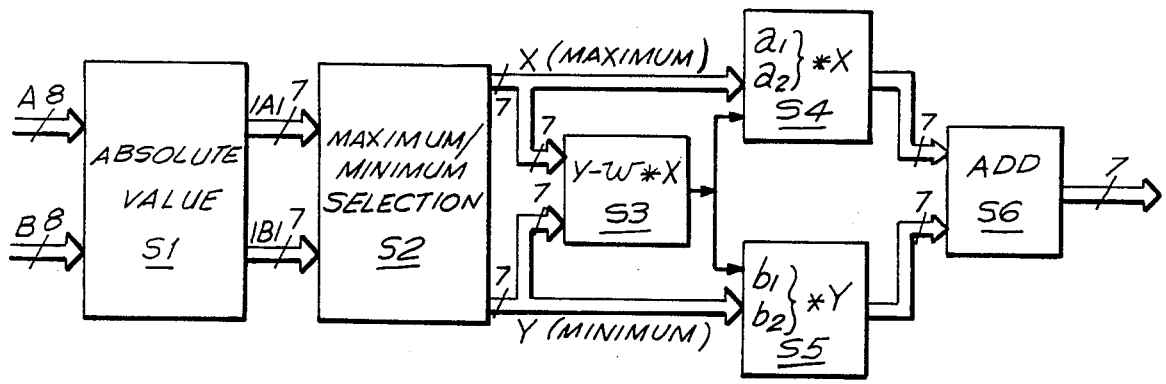
FIG. 1 is a functional block diagram illustrating the stages of a complex magnitude computer.

The general organization of one circuit for implementing the algorithm is shown in FIG. 1 where the real and imaginary (or in-phase and quadrature) signals A and B of the complex input Z are each converted to their absolute values in stage S1 to produce binary signals $|A|$ and $|B|$. Illustratively, A and B are each represented by 8 bit 2's complement binary signals, $a_7, a_6, a_5, a_4 \ldots a_0$, while their absolute values are 7 bit words, $.s_6 s_5 s_4 \ldots s_0$ ($a_7$ and $s_6$ are msb's).

Recalling from equation (1) that the dual approximations involve the maximum and minimum values as between $|A|$ and $|B|$, the circuit of FIG. 1 implements this selection with a stage S2 having digital circuits which compare the absolute values of A and B to determine and generate a 7 bit digital signal representing max($|A|$, $|B|$), designated X in FIG. 1 and a signal min($|A|$, $|B|$) designated Y.

As previously noted, to implement the two simultaneous non-linear equations, the signal X is subject to multiplication by the coefficients $a_1$ or $a_2$ depending on the active interval. This multiplication is implemented in a stage S4 for X while Y is similarly combined with its coefficients $b_1$ or $b_2$ in stage S5, also in dependence on the comparison.

To effect this comparison, i.e., to define the sector selection point dividing the two subintervals within the operative range, the digital comparator circuit S3 is employed. In this embodiment, a sector selection value is used such that Y is compared with the value 3X/8 and a corresponding logic level is applied to the multipliers S4 and S5 depending upon the results of that comparison thereby actuating the coefficients $a_1$, $b_1$, or $a_2$, $b_2$.

An arithmetic stage S6 combines the outputs of S4 and S5 to produce a resultant digital signal representing the magnitude of the input complex number Z.

Figure 3:
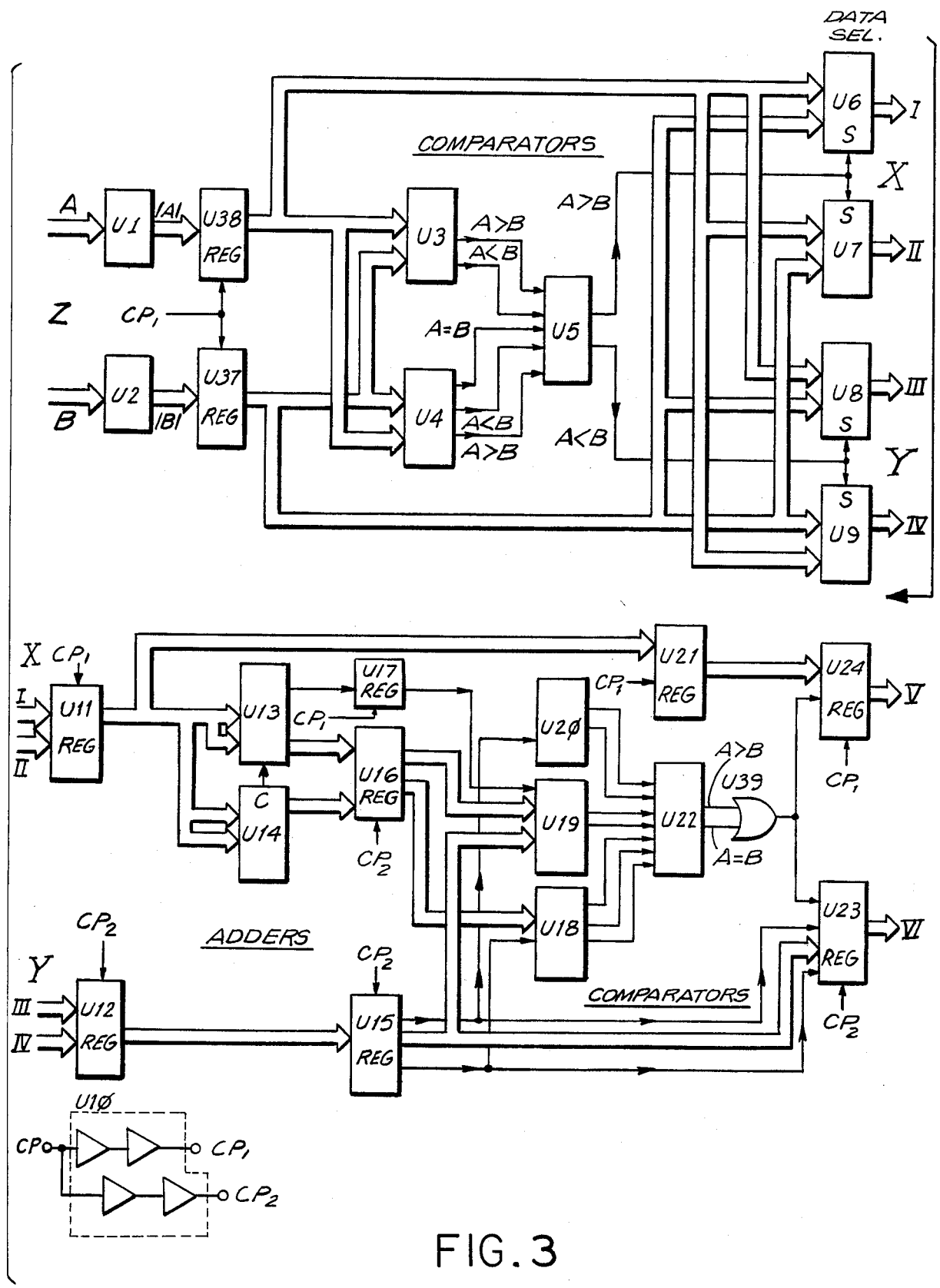
FIG. 3 is a schematic circuit diagram illustrating the input and initial stages of a specific complex magnitude computing circuit.
Figure 4:
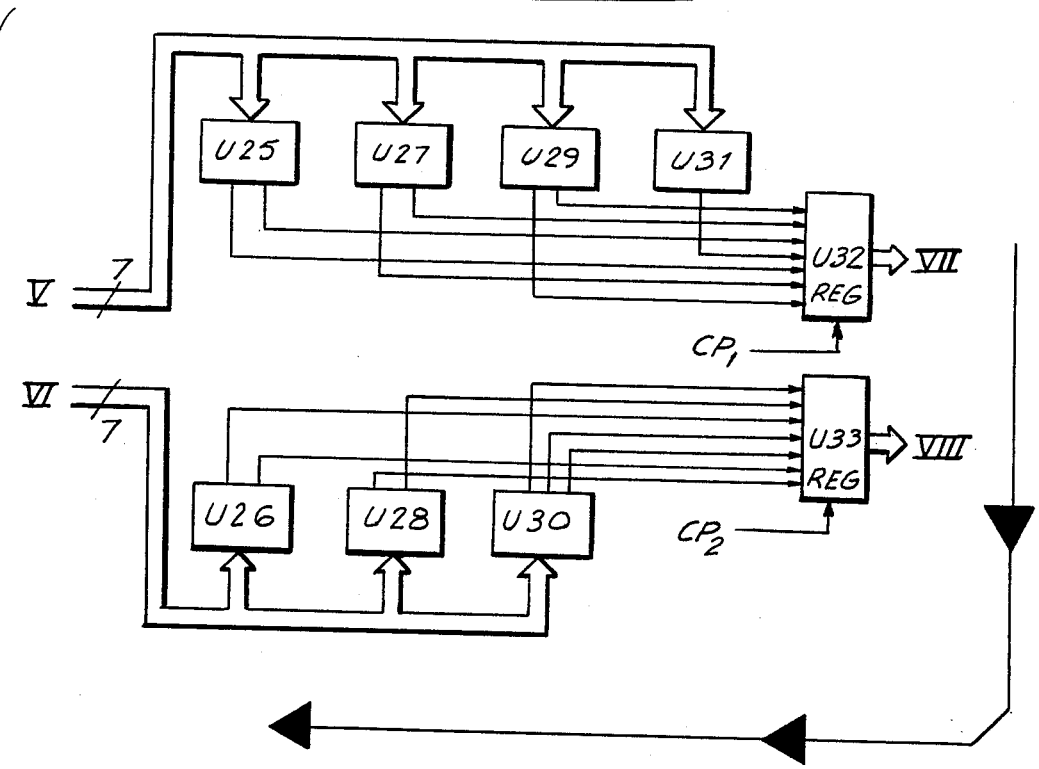
FIG. 4 is a schematic diagram illustrating the arithmetic and output sections of the circuit of FIG. 3.
Figure 4:
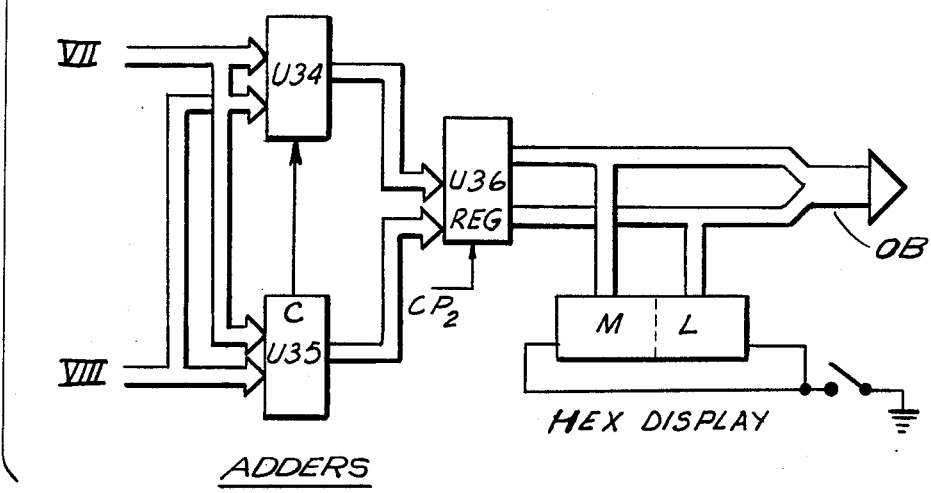

A specific circuit configuration implementing the foregoing is illustrated in FIGS. 3 and 4. As shown in FIG. 3, the real and imaginary components of complex number Z appear as 8 bit 2's complement digital words A and B each of which is applied to a respective field programmable logic array U1, U2. The arrays are programmed to convert their respective inputs into absolute values. Thus, for example, with input A of the form $d = a_7. a_6 a_5 a_4 \ldots a_0$, an output is produced of the form $0.s_6 s_5 s_4 s_0$. If $a_7$ is 0, the output will equal d; if $a_7$ is equal to 1, then the output will be the 2's complement of d.

Expressed relative to the input bits, the output bits are typically determined by ANDing and ORing combinations of input bits and their complements. For example the computations involving $s_0$, $s_1$ and $s_2$ are:

$$s_0 = a_0 \tag{15}$$

$$s_1(\overline{a}_1 a_0 + a_1 \overline{a}_0) a_7 + \overline{a}_7 a_1 \tag{16}$$

$$s_2 = (\overline{a}_2 a_0 + \overline{a}_2 a_1 + a_2 \overline{a}_0 \overline{a}_1) a_7 + \overline{a}_7 a_2 \tag{17}$$

These functions and those controlling the remaining bits are implemented in $U_1$ and $U_2$; they are determined in the case of two's complement by:

$$T_k = A_k \sum_{m=0}^{k-1} A_m + A_k \prod_{m=0}^{k-1} A_m \tag{18}$$

and in the case of absolute value by:

$$s_k = a_{msb} T_k + \overline{a}_{msb} a_k \tag{19}$$

The absolute values, $|A|$, and $|B|$ are applied to respective registers U38 and U37. The absolute value of A clocked at the output of U38 has its three ms bits $a_4$, $a_5$, $a_6$ applied to a comparator U3 which also receives the three msbs $b_4$, $b_5$, $b_6$ of U37's output. The four lsb's at the output of U38, $a_0$, $a_1$, $a_2$ and $a_3$ are applied to comparator U4 along with the corresponding least significant bits of the B signal. The outputs of the comparators U3 and U4 are applied to a further comparator U5 having two output lines one of which will be high depending upon whether $|A|$ is greater than or less than $|B|$. In the illustrative embodiment, data selector U6 receives the three ms bits of $|A|$ and $|B|$. Data selector U7 receives the four ls bits of $|A|$ and $|B|$. Consequently, the combined output X of selectors U6 and U7 will represent either $|A|$ or $|B|$ depending upon which of those is larger.

A similar arrangement characterizes U8 and U9. U9 receives the four ls bits of $|A|$ and $|B|$ while U8 receives the three ms bits of both variables. Depending upon the condition of the select line of U8 and U9, (which U5 will make high or low depending upon the relationship of $|A|$ to $|B|$), the combined output Y of U8 and U9 will be either $|A|$ or $|B|$ depending upon which has the smaller value.

Outputs X and Y are applied to registers U11 and U12 respectively. The output of U11 is applied in turn to a register U21 whose output is applied to a register U24. That register has its seventh bit determined by the output of OR gate U39.

A similar data flow may be traced for the Y input to register U12. The output of the latter is applied to a register U15 whose output is applied in turn to a register U23. As with U24, this register has its seventh bit determined by the output of OR gate U39.

The state of U39 is determined by a comparison of signal Y with the term $3X/8$ which indicates the boundary between sub-intervals. The term $3X/8$ is obtained by applying signal X to a pair of cascaded 4-bit binary full adders U13 and U14. The bits are distributed between the two to in effect multiply X by 0011 (binary), i.e. by 3. The resultant outputs are applied in turn to register U16. In addition, the least significant bit of U13 is applied to one stage of a register U17 whose q output is applied to 4-bit magnitude comparator U19 along with bits 4 through 7 of the output of U16 and bits 4 through 8 of the output of U15.

Another 4-bit magnitude comparator U18 receives bits 0 through 3 of U16 along with bit 0 of U15. A third magnitude comparator working with U18 and U19 is U20 which receives bit 6 from U15.

The comparisons made by U18, U19 and U20 are reflected in their output lines which are connected to 4-bit magnitude comparator U22 whose output lines constitute the inputs to the previously mentioned OR gate U39. As a consequence of the foregoing comparisons and bit manipulations, Y is compared with $3X/8$ thus determining the output of U39 as true or false and thereby specifying the operating sub-interval and active coeffecients.

As previously mentioned, the state of U39 determines whether bit 7 (the eighth bit) of the X and Y registers U24 and U23 are on or off. As a consequence, the coefficient of X and the coefficient of Y will have one of two values depending upon the comparison of Y to $3X/8$.

As seen in FIG. 4, the outputs of U24 and U23 are applied to a set of logic arrays U25, U27, U29 and U31 in the case of the X output and to U26, U28 and U30 in the case of the Y output. These stages and those they drive constitute the arithmetic section of the magnitude computing module and both the X channel and Y channel logic arrays are programmed to multiply the X and Y signals by the appropriate coefficients.

The resultant in the X channel is applied to a register U32 while the Y channel computation is applied to a register U33. The outputs of these registers are each directed to the cascaded adders U34 and U35. The outputs of the latter are combined in register U36 to provide a combined output at the data bus output OB for use as required. The result may also appear on a display of any convenient form, e.g., by displaying the 4 msb's and 4 lsb's in side-by-side relationship as illustrated.

For pipelining, the various interstage registers referred to above are synchronized from a clock source CP, FIG. 3, which produces an output $CP_1$ and $CP_2$ via inverters U10. The interstage registers synchronized by these sources are U37/U38, U11/U12, U15/U21, U23/U24, U32/U33, and U36.

By way of providing further implementation details, the registers in this implementation are 74LS377 types; the 4-bit magnitude comparators are each a 74S85. The data selector type is a 74LS157 while the 4 bit adders are each a 74S283.

The circuit of FIGS. 3, 4 operates at a maximum absolute error of 2.2%, a value which can be reduced with higher resolution. The synchronization rate is 10 mhz.

Longer word lengths e.g. 12 bit inputs, may be utilized. Also the interstage pipelining registers may be eliminated for straight combinatorial implementation with some sacrifice in speed.

Adoption of new developments in digital hardware technology (e.g., high speed 8K proms) would lead to circuit simplification along with increased accuracy and speed. The analytical algorithm would remain unchanged. The ultimate hardware realization would be the consolidtion of all logic onto a single integrated circuit.

What is claimed is:

1. A circuit for calculating the magnitude r of a complex number Z represented by inphase and quadrature signals A and B, respectively, comprising:
   (1) means for deriving signals related to the absolute values of signals A and B;
   (2) means for selecting the maximum (signal X) and minimum (signal Y) as between said absolute value signals;
   (3) means for multiplying signal X by a selected one or more of a plurality of X signal coefficients $a_1 \ldots a_n$ and for multiplying signal Y by a selected one or more of a plurality of Y signal coefficients $b_1 \ldots b_n$;
   (4) means responsive to said X and Y signals for selecting the operative coefficients $a_n$, $b_n$ forming the $a_nX$ and $b_nY$ products; and
   (5) means for combining said products to derive a signal relating to the magnitude r.

2. The circuit as defined in claim 1 in which said means responsive to the X and Y signals includes a circuit for comparing signals proportionate to said X and Y signals respectively, and for selecting the coefficients $a_n$, $b_n$ employed in said circuits for generating the products $a_nX$ and $b_nY$.

3. A circuit as defined in claim 1 or claim 2 in which a first set of said coefficients $a_1$, $b_1$ are activated over the range $0 \leq Z \leq w$ while a second set $a_2$, $b_2$ are enabled in the range $w \leq Z \leq 1$ where w is a function of X and Y.

4. A circuit as defined in claim 1 or claim 2 including register stages coupling said absolute value deriving means, said coefficient selecting means and said combining means, and a source of clocking pulses, for pipelining said calculation of r.

5. A circuit as defined in claim 1 or claim 2 in which said coefficients $a_1 \ldots a_n$, $b_1 \ldots b_n$ have the values of binary fractions.

6. A circuit as defined in claim 1 or claim 2 in which said means for deriving absolute values comprise logic arrays.

7. A circuit as defined in claim 1 or claim 2 in which the values of said coefficients are selected to minimize the error between the true and computed value of r.

8. The circuit as defined in claim 2 in which said product generating circuits are implemented as logic arrays.

9. A circuit as defined in claim 2 in which said comparing circuit compares Y with $3X/8$.

* * * * *